United States Patent
Al Sharnouby (10) Patent No.: US 10,656,981 B2
(45) Date of Patent: *May 19, 2020

(54) ANOMALY DETECTION USING SEQUENCES OF SYSTEM CALLS

(71) Applicant: 2236008 Ontario Inc., Waterloo (CA)

(72) Inventor: Mohamed Al Sharnouby, Ottawa (CA)

(73) Assignee: BlackBerry Limited, Waterloo, Ontario (CA)

(*) Notice: Subject to any disclaimer, the term of this patent is extended or adjusted under 35 U.S.C. 154(b) by 0 days.

This patent is subject to a terminal disclaimer.

(21) Appl. No.: 16/363,150

(22) Filed: Mar. 25, 2019

(65) Prior Publication Data
US 2019/0220334 A1 Jul. 18, 2019

Related U.S. Application Data

(63) Continuation of application No. 15/213,874, filed on Jul. 19, 2016, now Pat. No. 10,241,847.

(51) Int. Cl.
*G06F 21/52* (2013.01)
*G06F 21/55* (2013.01)
(Continued)

(52) U.S. Cl.
CPC ............ *G06F 9/546* (2013.01); *G06F 9/4812* (2013.01); *G06F 9/4843* (2013.01); *G06F 21/52* (2013.01);
(Continued)

(58) Field of Classification Search
CPC ..... G06F 21/56; G06F 9/546; G06F 2221/034
See application file for complete search history.

(56) References Cited

U.S. PATENT DOCUMENTS

| | | | |
|---|---|---|---|
| 6,441,833 B1 * | 8/2002 | Anderson | G06F 9/4484 715/762 |
| 6,735,703 B1 * | 5/2004 | Kilpatrick | G06F 21/53 713/151 |

(Continued)

FOREIGN PATENT DOCUMENTS

WO WO2018014129 1/2018

OTHER PUBLICATIONS

International Search Report dated Oct. 2, 2017, PCT/CA2017/050869.

(Continued)

*Primary Examiner* — Ali Shayanfar
(74) *Attorney, Agent, or Firm* — Rowand LLP (57) ABSTRACT

Systems and methods of detecting a call sequence anomaly in a message-based operating system are provided. A message may be received that indicates a programmatic procedure of an operating system was invoked. The message may include a programmatic procedure identifier, a sender process identifier, and a receiver process identifier. An invocation hash may be generated based on the message. The invocation hash may be translated to a smaller invocation identifier. The invocation identifier may be included in a translated call sequence that comprises invocation identifiers for a series of invocations. Depending on whether the translated call sequence is included in previously generated predetermined call sequences, the translated call sequence may be determined as an anomaly or not an anomaly.

17 Claims, 5 Drawing Sheets

(51) Int. Cl.
*G06F 21/56* (2013.01)
*G06F 9/54* (2006.01)
*G06F 9/48* (2006.01)

(52) U.S. Cl.
CPC ............ *G06F 21/554* (2013.01); *G06F 21/56* (2013.01); *G06F 21/566* (2013.01); *G06F 2221/034* (2013.01)

(56) References Cited

U.S. PATENT DOCUMENTS

| | | | | |
|---|---|---|---|---|
| 6,742,124 | B1* | 5/2004 | Kilpatrick | G06F 21/316 |
| | | | | 713/194 |
| 7,900,194 | B1 | 3/2011 | Mankins | |
| 8,301,433 | B2* | 10/2012 | Kinno | G06F 8/20 |
| | | | | 703/22 |
| 9,146,787 | B2* | 9/2015 | Zhu | H04L 67/32 |
| 9,516,053 | B1 | 12/2016 | Muddu | |
| 9,892,253 | B1* | 2/2018 | Mehr | G06F 21/52 |
| 2001/0039613 | A1 | 11/2001 | Ohishi | |
| 2004/0205474 | A1 | 10/2004 | Eskin et al. | |
| 2005/0229250 | A1* | 10/2005 | Ring | G06F 21/57 |
| | | | | 726/23 |
| 2006/0190218 | A1* | 8/2006 | Agrawal | G06F 11/3466 |
| | | | | 702/186 |
| 2006/0265455 | A1* | 11/2006 | Yakushev | G06F 9/546 |
| | | | | 709/206 |
| 2007/0107052 | A1* | 5/2007 | Cangini | G06F 21/55 |
| | | | | 726/22 |
| 2007/0156659 | A1 | 7/2007 | Lim | |
| 2007/0156670 | A1 | 7/2007 | Lim | |
| 2008/0059474 | A1 | 3/2008 | Lim | |
| 2009/0132669 | A1 | 5/2009 | Milliken | |
| 2009/0144823 | A1 | 6/2009 | Lamastra | |
| 2009/0187396 | A1 | 7/2009 | Kinno | |
| 2009/0241170 | A1* | 9/2009 | Kumar, Sr. | H04L 47/10 |
| | | | | 726/3 |
| 2011/0271344 | A1 | 11/2011 | Unagami | |
| 2011/0296435 | A1* | 12/2011 | Simsek | G06F 8/34 |
| | | | | 719/313 |
| 2013/0305098 | A1* | 11/2013 | Keromytis | G06F 11/08 |
| | | | | 714/38.1 |
| 2014/0137246 | A1* | 5/2014 | Baluda | G06F 21/552 |
| | | | | 726/22 |
| 2014/0281539 | A1* | 9/2014 | Faltyn | H04L 63/08 |
| | | | | 713/168 |
| 2015/0287416 | A1 | 10/2015 | Brands | |
| 2016/0127395 | A1* | 5/2016 | Underwood | G06F 21/556 |
| | | | | 726/23 |
| 2016/0239596 | A1* | 8/2016 | Pieczul | G06F 21/566 |
| 2016/0342453 | A1* | 11/2016 | Khan | G06F 11/079 |
| 2016/0359740 | A1 | 12/2016 | Parandehgheibi | |
| 2017/0034160 | A1* | 2/2017 | Brands | H04L 63/0861 |
| 2017/0124319 | A1* | 5/2017 | Peleg | G06F 21/554 |
| 2018/0024874 | A1* | 1/2018 | Al Sharnouby | G06F 21/566 |
| | | | | 726/22 |

OTHER PUBLICATIONS

Anil Buntwal Somayaji, "Operating System Stability and Security through Process Homeostasis", dated Jul. 2002.
Notices of References Cited, U.S. Appl. No. 15/213,874.
Hofmeyr, S et al.; "Intrusion Detection using Sequences of System Calls" dated Aug. 18, 1998, Aug. 18, 1998.
Snoeren, A et al.;"Single-Packet IP Traceback" IEEE/ ACM Transcations on Networking, dated Dec. 1, 2002, Dec. 1, 2002.
Extended European Search Report dated Nov. 13, 2019, European Patent Application No. 17830152.9.

* cited by examiner

ANOMALY DETECTION USING SEQUENCES OF SYSTEM CALLS

BACKGROUND

1. Technical Field

This application relates to call sequence anomaly detection and, in particular, to anomaly detection in operating system calls.

2. Related Art

In message based operating systems, the calling or invocation of most programmatic procedures of an operating system involves a messaging system. In message based operating systems, the invocations of programmatic procedures of the operating system may result in corresponding messages being passed through the messaging system from a sender process to a receiver process.

In some examples, the messaging system is implemented in a microkernel. The microkernel may provide a relative small number of services needed to implement the operating system. For example, the services of the microkernel may include low-level address space management, process management, and inter-process communication (IPC). The messaging system may be part of the inter-process communication service.

A process is an instance of a computer program that is being executed. In some operating systems, a process may be made up of multiple threads of execution that execute instructions concurrently.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Methods and systems for detecting call sequence anomalies in a message-based operating system are provided. Software attacks or other anomalies may be detected by the methods and systems described herein. Even attacks on previously unknown software vulnerabilities—known as zero day attacks—may be detected. Other detected anomalies may include, for example, software defects or other unusual events, such as hardware failures and timeouts.

Figure 1:
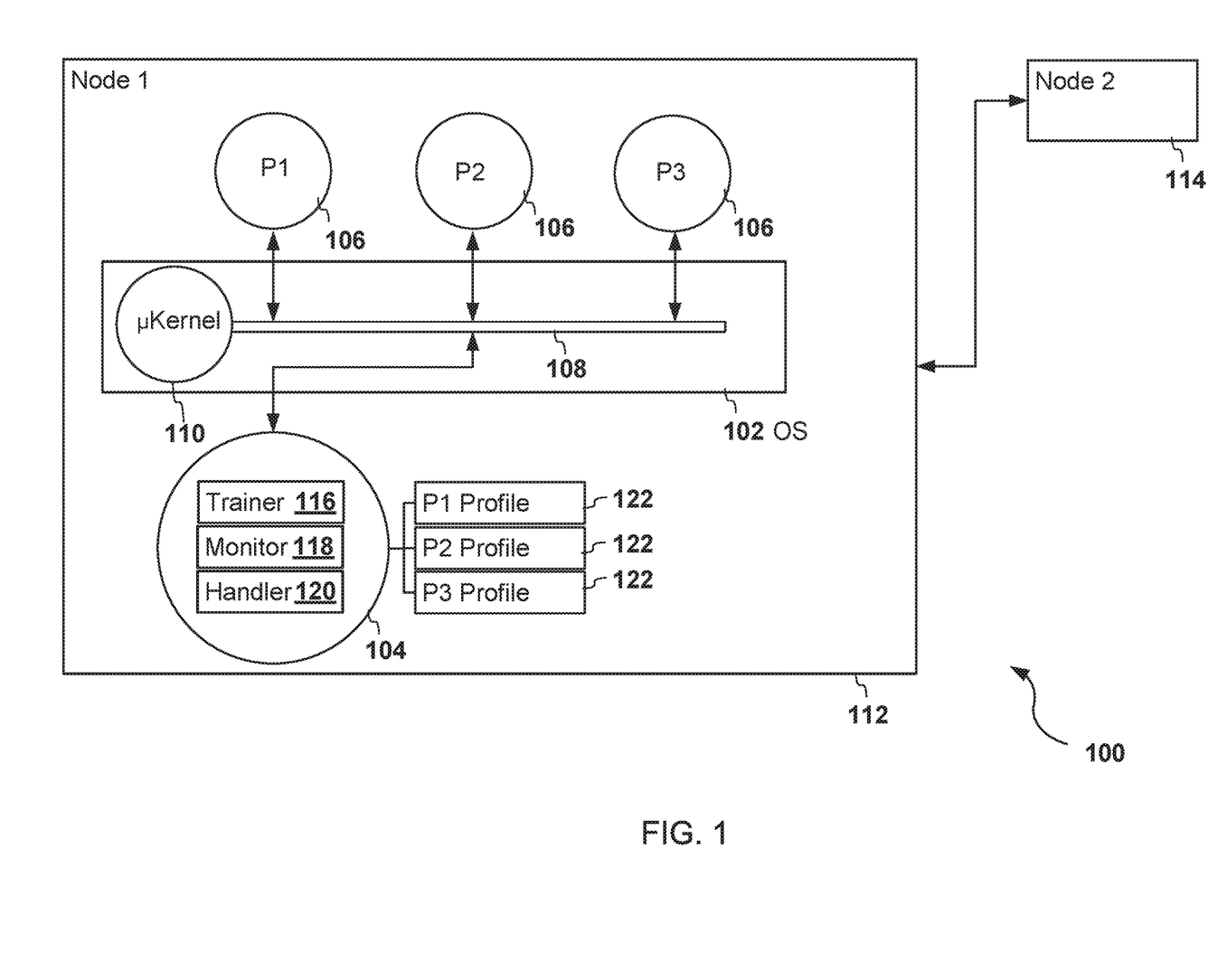
FIG. 1 illustrates an example of a system to detect a call sequence anomaly in a message-based operating system.

FIG. 1 illustrates an example of a system 100 to detect a call sequence anomaly in a message-based operating system (OS) 102. The system 100 may include an anomaly detector 104 that executes within the OS 102, or alternatively, as shown in FIG. 1, as a process that executes outside of the OS 102. The OS 102 handles invocations of operating system calls by processing corresponding messages from one or more processes 106 (designated P1, P2, and P3 in FIG. 1).

Incidentally, the OS 102 also handles invocations of operating systems calls made by the anomaly detector 104 when the anomaly detector 104 runs as a process outside of the OS 102. The OS 102 may also handle interprocess communications through a similar mechanism, passing messages between the processes 106 over a software bus 108. The OS 102 may include a microkernel 110 in some examples that implements the message passing functionality of the OS 102.

In addition to interprocess communication, the OS 102 may handle internode communication in some implementations. For example the OS 102, the processes 106, and the anomaly detector 104 may be included on a first node 112, while a second node 114 may include an operating system and one or more processes. Any of the one or more processes 106 on the first node 112 may communicate with a target process on the second node 114 by passing a message to the OS 102 of the first node 112, which delivers the message to the target process on the second node 114.

The nodes 112, 114 may be on the same device or, alternatively, on separate physical devices in communication over a network. Each node may be an instance of a server, an instance of a virtual machine, a computing device, or any other device on a network, where the device may be real or virtual.

The anomaly detector 104 may include a trainer 116, a monitor 118, and a handler 120. The trainer 116 may build a profile that provides an indication of normal behavior. Normal behavior is known behavior and/or predetermined behavior. The monitor 118 may process invocation information received from the OS 102 and detect any anomalies. In particular, the monitor 118 may detect deviations from the predetermined behavior described in the profile. The handler 120 may react to any detected anomaly. For example, the handler 120 may raise an alarm or otherwise take action in response to the detection of an anomaly.

The trainer 116 builds a profile 122 that identifies sequences of invocations of operating system programmatic procedures that the process 106 makes under normal operations. For example, FIG. 1 illustrates three profiles 122, designated P1 Profile, P2 Profile, and P3 Profile, one profile for each of the three processes 106 illustrated (P1, P2, and P3).

Short sequences of system calls are a good discriminator between normal and abnormal behavior of a process. A collection of the short sequences of system calls may be a relatively stable signature of normal behavior.

For a non-trivial software program executing in a process, the complete set of programmatic procedure invocations may be enormous. However, a local (compact) ordering of the invocations may be remarkably consistent over longer periods of operation of the process. An example is provided below to illustrate the operation of the trainer 116.

For example, one of the processes 106 may invoke the following operating system programmatic procedures in the following order: open( ), read( ), mmap( ), mmap( ), open( ), getrlimit( ), mmap( ), and close( ). A window size L may be selected, where the window size L indicates the number of sequential invocations to include in the window. The number of invocations k to follow the first invocation in the window (in other words, k is a lookahead size). The window size L equals the lookahead size k+1. Table 1 below illustrates a set of sequential invocations formed with a window size of four (k=3) as the window slides across the example sequence of invocations: open( ), read( ), mmap( ), mmap( ), open( ), getrlimit( ), mmap( ), and close( ).

TABLE 1

| Call | Previous Call | Second Prev. Call | Third Prev. Call |
|---|---|---|---|
| open | N/A | N/A | N/A |
| read | open | N/A | N/A |
| mmap | read | open | N/A |
| mmap | mmap | read | open |
| open | mmap | mmap | read |
| getrlimit | open | mmap | mmap |
| mmap | getrlimit | open | mmap |
| close | mmap | getrlimit | open |

Table 2 illustrates the calls (invocations) from Table 1 ordered by the first call in the window, and compacted. When compacted, the invocations in a respective position (such as Previous Call, Second Previous Call, or Third Previous Call) are consolidated as being acceptable for that respective position. For example, the following call sequence (ordered from the most recent to the oldest invocation), would be considered found in Table 2 even though the same sequence is not listed in Table 1: mmap( ), read( ), read( ), open( ). The reason is that read( ) is considered acceptable at the Second Previous Call position for the mmap( ) call.

TABLE 2

| Call | Previous Call | Second Prev. Call | Third Prev. Call |
|---|---|---|---|
| open | mmap | mmap | read |
| read | open | N/A | N/A |
| mmap | read | open | open |
|  | mmap | read | mmap |
|  | getrlimit | open |  |
| getrlimit | open | mmap | mmap |
| close | mmap | getrlimit | open |

An anomaly in the call sequence may be detected by sliding a same sized window over the sequential invocations of the operating system programmatic procedures that are made by the process while the process is being monitored. For example, the process may invoke the following operating system programmatic procedures in the following order while being monitored: open, read, mmap, open, open, getrlimit, mmap, close. Table 3 below illustrates deviations from Table 2 when comparing with a set of sequential invocations formed as a window slides across the sequence of invocations made by the process while the process is monitored. The deviations are shown with capitalization. In other words, "open" is ultimately preceded by "read" instead of "mmap" on the second previous call at line 1; "open" is ultimately preceded by "open" instead of "read" on the third previous call at line 1; "open" is preceded by "open" instead of "mmap" on the previous call at line 1; and "getrlimit" is ultimately preceded by "open" instead of "mmap" at the second next call on line 3.

TABLE 3

| Call | Previous Call | Second Prev. Call | Third Prev. Call |
|---|---|---|---|
| open | MMAP | MMAP | READ |
| read | open | N/A | N/A |
| mmap | read | open | N/A |
|  | mmap | read | open |
|  | getrlimit | open | mmap |
| getrlimit | open | MMAP | mmap |
| close | mmap | getrlimit | open |

In the message based OS 102, an issue may be that most—if not all—of the operating system programmatic procedure invocations are made through corresponding messages sent through the operating system 102. Each of the messages may have a format similar to a message 202 shown in FIG. 2, which is more complicated than a simple one process method invocation described above.

Figure 2:
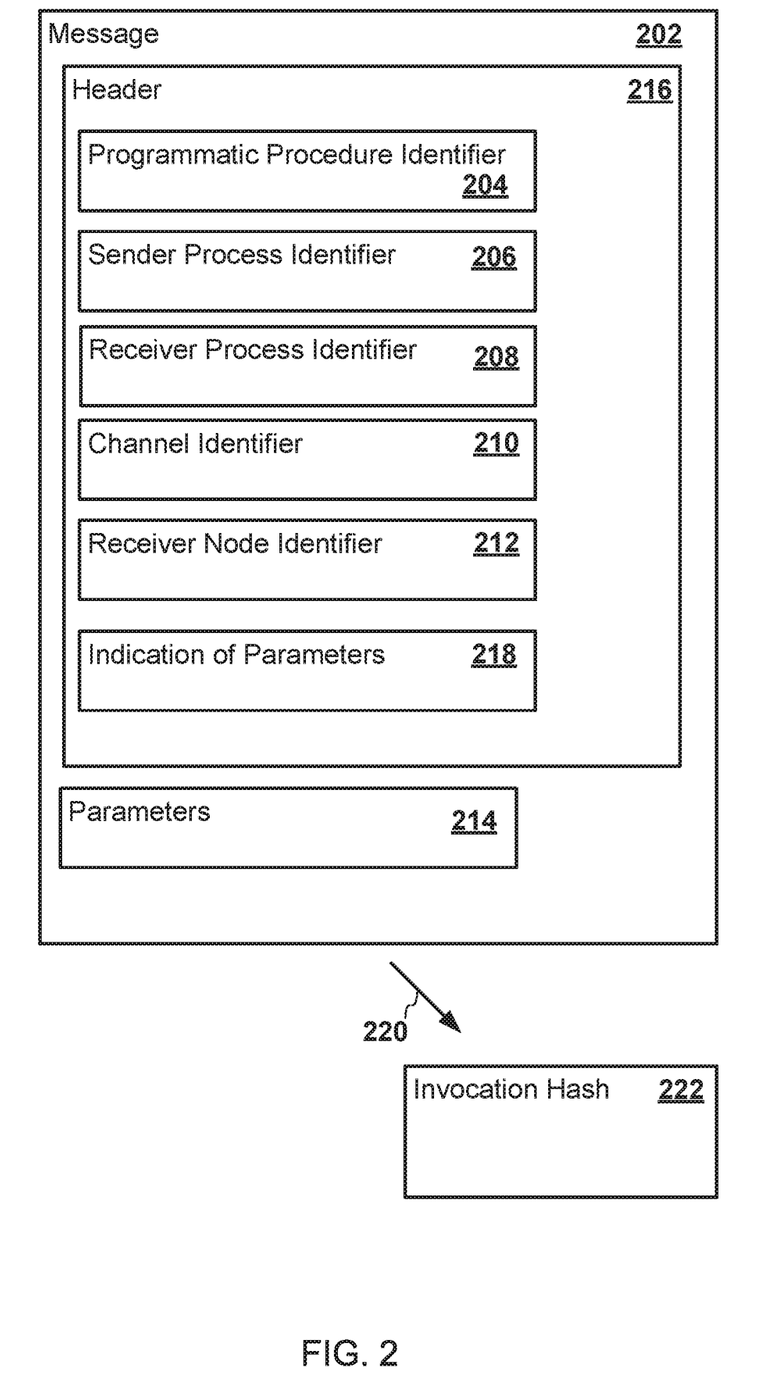
FIG. 2 illustrates an example message.

The message 202 may include a programmatic procedure identifier 204, a sender process identifier 206, a receiver process identifier 208, a channel identifier 210, a receiver node identifier 212, and/or one or more parameters 214 passed to the programmatic procedure. The message 202 may include additional, fewer, or different components. For example, the message 202 may include a header 216 that includes the programmatic procedure identifier 204, the sender process identifier 206, the receiver process identifier 208, the channel identifier 210, and/or the receiver node identifier 212. In some examples, the header 216 may include an indication 218 of the parameters 214 passed to the programmatic procedure. For example, the indication 218 of the parameters 214 may be a fixed size value that includes the first 12 bytes of any of the parameters 214. If no parameters are passed and/or less than 12 bytes of parameters are passed as a parameter, then the indication 218 of the parameter 214 may include a place holder, such as zero, in any unused portion of the fixed size value.

The programmatic procedure identifier 204 may be any identifier of the programmatic procedure that was invoked. The programmatic procedure identifier 204 may be a text name of the programmatic procedure, a numeric value identifying the programmatic procedure, or any other value that identifies the programmatic procedure. For example, programmatic procedure identifiers may be unique numbers that the OS 102 assigned to all of the programmatic procedures of the OS 102 that the processes 106 may invoke.

The sender process identifier 206 may be any identifier that identifies the process 106 that invoked the programmatic procedure identified in the message 202. Similarly, the receiver process identifier 208 may be any identifier that identifies the process 106 that is to receive the message 202. For example, the receiver process identifier 208 may identify a process executing within the OS 102, any of the processes 106 executing on the OS 102 and/or any process on another node. The OS 102 may assign static process identifiers 206, 208 so that the process identifiers 206, 208 remain the same even after a reboot of the nodes 112, 114. For example, the OS 102 may assign a unique number or name to a program executable. For example, the "dir" executable, which provides a listing of files on some operating systems, may be assigned the name "dir". Multiple instantiations of a program executable may, in some examples, have additional information added to the process identifier 206, 208. For example, the second instance of the "dir" executable may be assigned "dir-2" as the sender process identifier 206.

The channel identifier 210 may be any identifier that identifies a communication channel between processes and/or between a process and the OS 102. For example, for each channel that a process creates, the OS 102 may assign a sequentially higher number. As an illustrative example, the first channel identifier created by the process may be assigned the identifier "1", the second channel identifier created by the process may be assigned the identifier "2", and so on.

The receiver node identifier 212 may be any identifier that identifies the node that is to receive the message 202. Examples of the node identifier 212 may include a static network address, a media access control address (MAC address), an Ethernet address, a wireless hardware address, a static Internet Protocol (IP) address, or any other such identifier.

The parameters 214 may include a definition of the parameters, such as a data type of each parameter arranged in the order the parameters are passed to the programmatic procedure. The definition of the parameters may be useful in some examples to distinguish between programmatic procedures that are overloaded (multiple programmatic procedures have the same name, but different parameters). Alternatively or in addition, the parameters 214 may include one or more actual values passed as input to the programmatic procedure.

The anomaly detector 104 may generate (220) an invocation hash 222 based on the message 202. The invocation hash 222 may be a non-cryptic hash of all or any portion of the message 202. Alternatively, the invocation hash 222 may be a cryptic hash of all or any portion of the message 202. The anomaly detector 104 may generate the invocation hash 222 using any suitable hash function. A hash function may be any function that maps data of arbitrary size to data of fixed size. If the anomaly detector 104 is configured to monitor the processes 106 in real-time, then the hash function chosen may be one that completes relatively quickly. The invocation hash 222 may be 32 bits, 64 bits, or any other size.

In one example, the invocation hash 222 may be a hash of the programmatic procedure identifier 204 and the receiver process identifier 208. Alternatively, the invocation hash 222 may be a hash of the programmatic procedure identifier 204, the sender process identifier 206, and the receiver process identifier 208. Alternatively, the invocation hash 222 may be a hash of the programmatic procedure identifier 204, the sender process identifier 206, the receiver process identifier 208, the channel identifier 210, the receiver node identifier 212, and/or the indication 218 of the parameters 214 passed to the programmatic procedure. In other words, the invocation hash 222 may be a hash of the message 202 and/or any combination of the components of the message 202.

The invocation hash 222 is an innovative structure that identifies a programmatic procedure invocation. The more components of the message 202 passed to the hash function, the more narrowly the programmatic procedure invocation is identified. For example, passing the receiver node identifier 212 to the hash function will cause the invocation hash 222 to distinguish between invocations to multiple nodes even if the invocations are otherwise identical.

Figure 3:
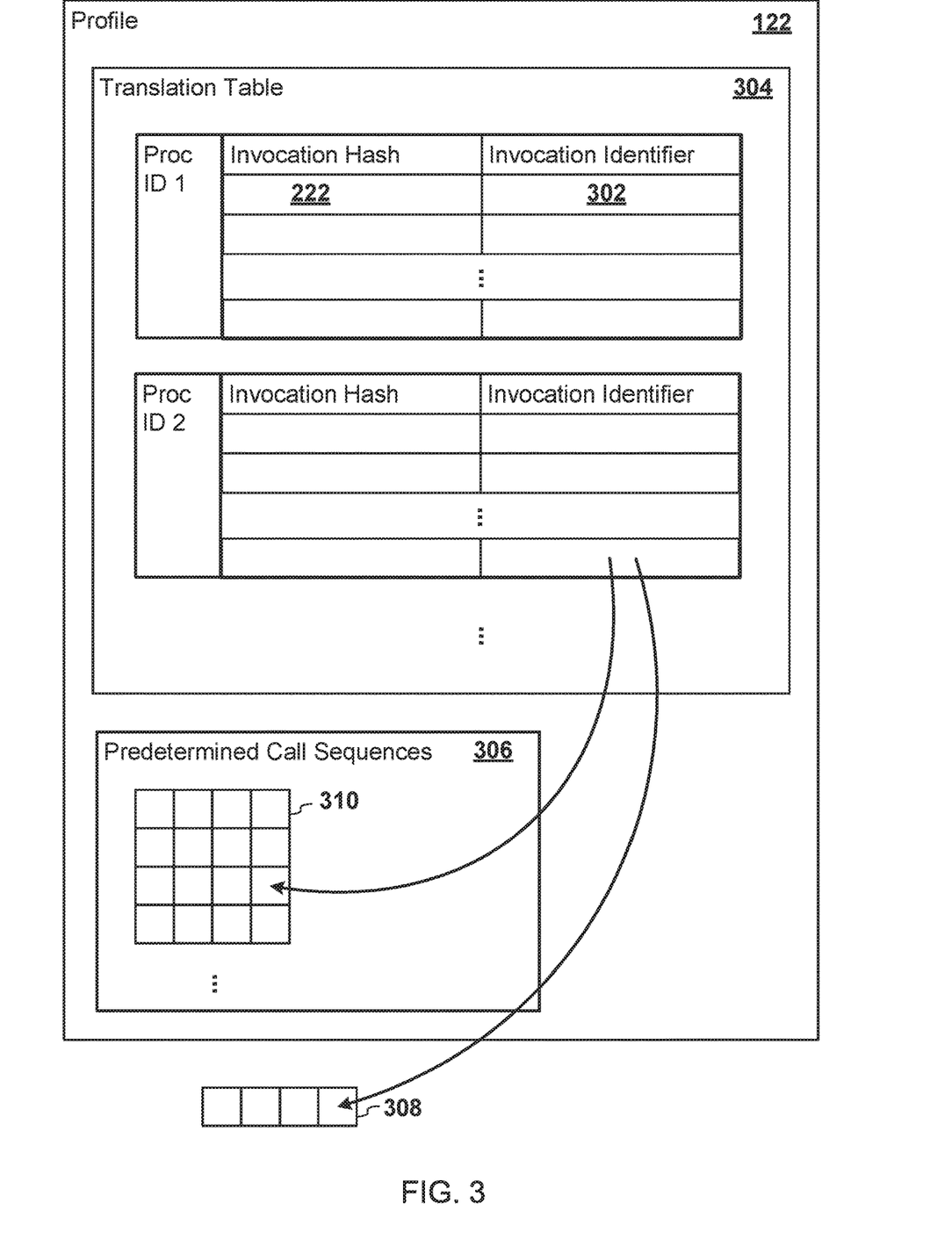
FIG. 3 illustrates an example profile.

Because the invocation hash 222 may be relatively large in size, an innovative translation mechanism is provided. FIG. 3 illustrates an example of the profile 122 embodying the translation mechanism. As indicated earlier above, the profile 122 identifies sequences of invocations of operating system programmatic procedures that a specific one of the processes 106 makes under normal operations. In particular, the profile 122 may include a translation table 304 or other suitable translation data structure and predetermined call sequences 306.

During operation of the trainer 116 of the anomaly detector 104, the trainer 116 may generate the profile 122 for one or more processes 106. The one or more processes 106 are executed in a controlled environment resulting in call sequences that represent normal or expected behavior of the processes 106.

The anomaly detector 104 and/or the trainer 116 may receive the message 202 indicating that a programmatic procedure of the operating system 102 was invoked. For example, the anomaly detector 104 and/or the trainer 116 may have registered with a tracing feature of the OS 102 in order to receive a copy of the message 202 (and copies of other messages corresponding to programmatic procedure invocations) in real time. Alternatively, the anomaly detector 104 and/or the trainer 116 may be part of the OS 102 and may be configured to receive a copy of the message 202 (and other messages corresponding to programmatic procedure invocations) in real time. In yet another example, the anomaly detector 104 and/or the trainer 116 may read the message 202 (and other messages indicating that programmatic procedures of the operating system 102 was invoked) from a trace file in real time or long after the programmatic procedure was invoked.

The anomaly detector 104 and/or the trainer 116 may generate (220) the invocation hash 222 based on the message 202 as described above. As described above, generating (220) the invocation hash 222 based on the message 202 includes generating a hash of the entire message 202 or generating a hash of one or more components of the message 202.

The anomaly detector 104 and/or the trainer 116 may translate the invocation hash 222 to an invocation identifier 302. Like the invocation hash 222, the invocation identifier 302 is an identifier that identifies the programmatic procedure invocation. However, the invocation identifier 302 is smaller in size than the invocation hash 222.

To perform the translation, the anomaly detector 104 and/or the trainer 116 may use a translation table 304 or other translation data structure. The translation table 304 may include rows comprising invocation hashes and corresponding invocation identifiers. To translate the invocation hash 222 to the invocation identifier 302, the translation table 304 may be searched for a row that has an invocation hash matching the invocation hash 222 just generated. If there is such a row, then the invocation identifier 302 is read from the row of the translation table 304. Alternatively, if there is no matching entry, then the invocation hash 222 may be added to the invocation table 304 in addition to a newly assigned corresponding invocation identifier 302. The invocation identifier 302 may be any identifier that is unique to the rows in the invocation table 304 (or unique to the entries in any other translation data structure).

Alternatively or in addition, the invocation identifiers may be the row numbers in the translation table 304. In such examples, the invocations identifiers may not need to be stored in the rows of the translation table 304. In some examples, the rows may include programmatic procedure identifiers for faster lookup performance. In such examples, rows may be searched for programmatic procedure identifiers matching the programmatic procedure identifier 204 in the message 202, and the resultant matching rows may then be searched for the invocation hash 222. If the invocation hash 222 needs to be added to such a table, the programmatic procedure identifier 204 may be included in the row.

Any other suitable data structure may be used instead the translation table 304. For example, a translation data structure may include a first hash table having a key comprising programmatic procedure identifiers and corresponding values comprising a second hash table. The second hash table may have a key comprising invocation hashes for the corresponding programmatic procedure identifier and values comprising corresponding invocation identifiers.

The invocation of the programmatic procedure identified in the message 202 may be one invocation in a series of invocations of programmatic procedures made from the process 106 identified by the sender process identifier 206 of the message 202. With the invocation identifier 302 obtained, the invocation identifier 302 may now be included in a translated call sequence 308 that comprises invocation identifiers for a series of programmatic procedure invocations. For example, the translated call sequence 308 may include invocation identifiers identifying programmatic procedure invocations that occurred before the invocation of the programmatic procedure identified by the invocation hash 222 (and by the invocation identifier 302). The number of invocation identifiers in the translated call sequence 308 may equal to the window size L.

The anomaly detector 104 and/or the trainer 116 may determine whether the translated call sequence 308 is included in predetermined call sequences 306. Each of the predetermined call sequences comprises invocation identifiers identifying the programmatic procedure invocations in the respective call sequence. The invocation identifiers in the predetermined call sequences 306 are each mapped to invocation hashes in the translation table 304 or other translation data structure. The predetermined call sequences 306 may be stored in any suitable data structure. For example, the predetermined call sequences 306 may be stored in a call sequence permutation table 310. The predetermined call sequences 306 may be a compact set of call sequences. If compact, the predetermined call sequences 306 may indicate, for the invocation identifier 302 of the current programmatic procedure invocation, a set of acceptable invocation identifiers for each corresponding previous position in the translated call sequence 308, where the set of acceptable invocation identifiers for any previous position is independent of the sets of acceptable invocation identifiers for the other previous positions in the translated call sequence 308. Accordingly, determining whether the translated call sequence 308 is included in the predetermined call sequence 306 may be more involved than looking for a row in a table that matches the content of the translated call sequence 308. For example, the sets of acceptable invocations may be sequentially checked for the previous positions in the translated call sequence 308.

If the translated call sequence 308 is not already included in the predetermined call sequences, then the anomaly detector 104 and/or the trainer 116 may add the translated call sequence 308 to the predetermined call sequences 306.

The anomaly detector 104 and/or the trainer 116 may repeat the procedure described above to develop the profile 122 for one or more of the processes 106. When repeating, the invocation identifiers in the translated call sequence 308 may be shifted, removing the invocation identifier for the oldest invocation thereby making room for the invocation identifier of the next programmatic procedure invocation.

When the predetermined call sequences 306 are sufficiently populated, then the profile 122 for each of the processes 106 may be used to detect anomalies. Any technique for determining whether the predetermined call sequences 306 are sufficiently populated may be used. For example, the trainer 116 may operate for a predetermined length of time. In another example, the trainer 116 may operate until the translated call sequence 308 is found in the predetermined call sequence 306 a predetermined percentage of the time. In yet another example, the trainer 116 may operate while a predetermined set of use cases are carried out.

Figure 4:
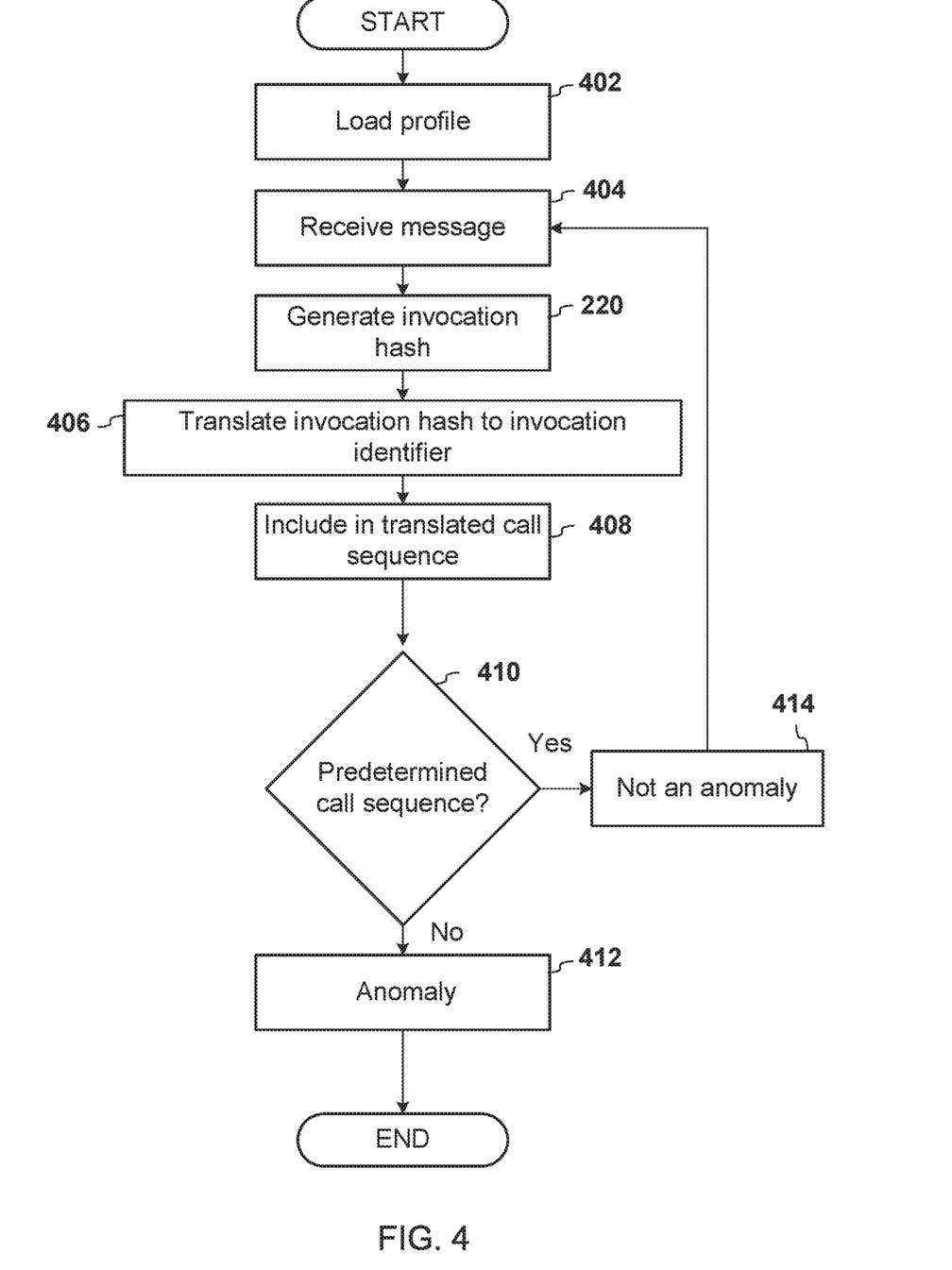
FIG. 4 illustrates a flow diagram of example logic of a system to detect a call sequence anomaly.

FIG. 4 illustrates a flow diagram of example logic of the system 100 to detect a call sequence anomaly in the message-based operating system 102. The logic may include additional, different, or fewer operations.

When the process 106 starts, the profile 122 may be loaded (402) for the software program executed in the process 106. For example, the monitor 118 may receive a message from the OS 102 indicating that the process 106 just spawned or started. The process 106 may be identified in the message by a process identifier. The monitor 118 may load the profile 122 that was previously generated for a process that had the same process identifier.

The message 202 may be received (404) indicating an invocation of a programmatic procedure of the OS 102 was made. For example, the monitor 118 may receive the message 202 from the OS 102. As described above, the message 202 may include the programmatic procedure identifier 204, the sender process identifier 206, the receiver process identifier, and/or other components. The sender process identifier 206 may match the process identifier corresponding to the profile 122 loaded earlier.

The invocation hash 222 may be generated (220) based on the message 202. For example, the monitor 118 may generate (220) the invocation hash 222 based on the programmatic procedure identifier 204, the sender process identifier 206, the receiver process identifier 208, and/or other components of the message 202.

The invocation hash 222 may be translated (406) into the invocation identifier 302 as described above. For example, the monitor 118 may translate the invocation hash 222 to the invocation identifier 302 using the translation table 304. If the invocation hash 222 cannot be found in the translation table 304, then the invocation identifier 302 may be set to a placeholder value that indicates an unknown invocation. The placeholder will guarantee that the translated call sequence 308 is not found in the predetermined call sequences 306.

The invocation identifier 302 may be included (408) in the translated call sequence 308. As explained above, the translated call sequence 308 comprises invocation identifiers for a series of invocations of programmatic procedures. If the length of the translated call sequence 308 is the window size L before including the invocation identifier 302, then the invocation identifier corresponding to the oldest invocation may be removed to make room for the invocation identifier 302 just obtained. Alternatively, if the length of the translated call sequence 308 is not yet the window size L, then operations may return to receive (404) the next message indicating the process 106 invoked another programmatic procedure.

A determination (410) may be made whether the translated call sequence 308 is included in the predetermined call sequences 306 of the profile 122. For example, the monitor 118 may search the predetermined call sequences 306 for the translated call sequence 308. As explained above, such a search may involve, for example, sequentially checking the sets of acceptable invocation identifiers for each position in the translated call sequence 308.

If the translated call sequence 308 is not included in the predetermined call sequences 306, then the translated call sequence 308 may be identified (412) as an anomaly. Otherwise, the translated call sequence 308 may be determined (414) not to be an anomaly.

If the translated call sequence 308 is determined not to be an anomaly, then operations may return to receive (404) the next message indicating the process 106 invoked another programmatic procedure. However, if the translated call sequence 308 is identified as an anomaly, then operations may end by, for example, raising an alarm.

Alternatively or in addition, any type of action may be taken if the translated call sequence 308 is identified as an anomaly. For example, operations may continue to try to detect anomalies by returning to receive (404) the next message indicating the process 106 invoked another programmatic procedure. The handler 120 may handle any detected anomaly, such as raising an alarm, slowing the process 106 down, halting the process 106, and/or alter a safety level of a system. For example, if the OS 102 controls a vehicle steering system, the vehicle steering system may switch off in response to detection of an anomaly because disabling the vehicle steering system may be viewed as a safer operation level in view of a potential software attack. The handler 120 may be customized for specific applications using, for example, a plug-in architecture.

Furthermore, the handler 120 may handle the sensitivity of anomaly detection. For example, if the translated call sequence 308 is identified (412) as an anomaly, the handler 120 may increment a counter instead of immediately detecting an anomaly. The handler 120 may wait to detect an anomaly until after the counter passes a threshold value.

Figure 5:
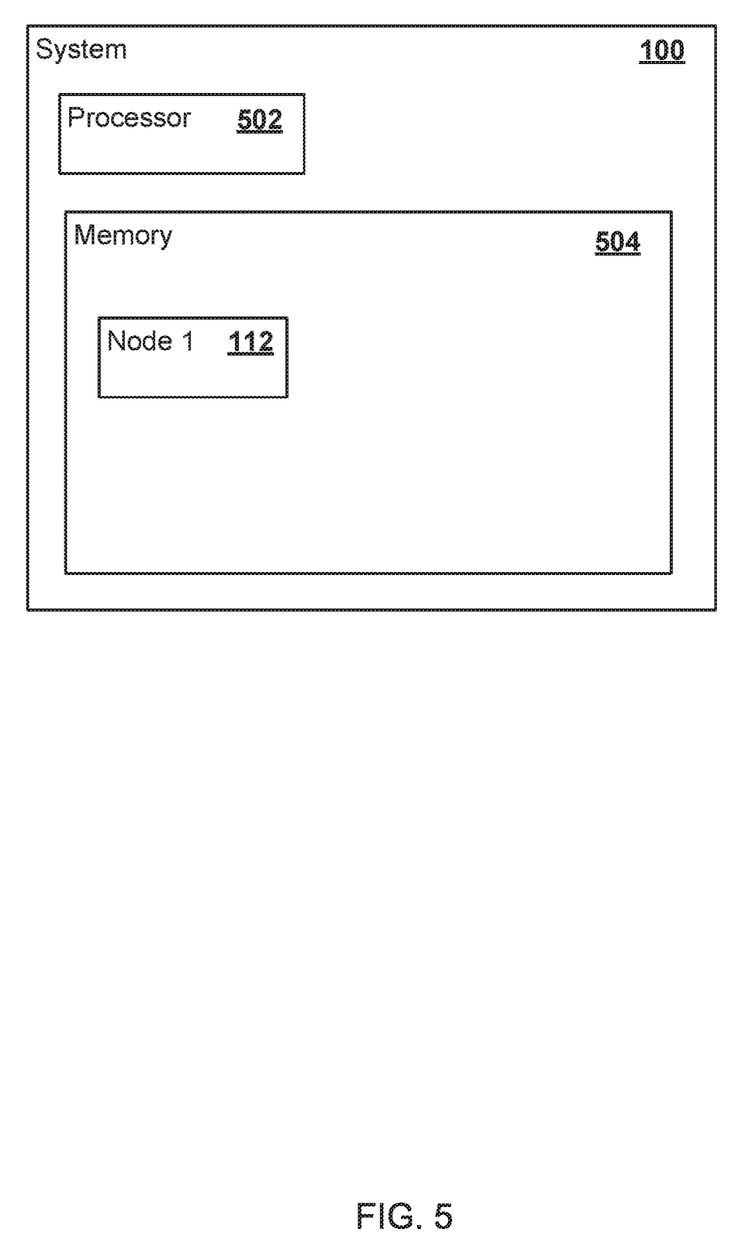
FIG. 5 illustrates an example of a system that includes a memory and a processor.

The system 100 may be implemented with additional, different, or fewer components. For example, FIG. 5 illustrates an example of the system 100 that includes a memory 504 and a processor 502.

The processor 502 may be in communication with the memory 504. In one example, the processor 502 may also be in communication with additional elements, such as a network interface (not shown). Examples of the processor 502 may include a general processor, a central processing unit, a microcontroller, a server, an application specific integrated circuit (ASIC), a digital signal processor, a field programmable gate array (FPGA), and/or a digital circuit, analog circuit.

The processor 502 may be one or more devices operable to execute logic. The logic may include computer executable instructions or computer code embodied in the memory 504 or in other memory that when executed by the processor 502, cause the processor 502 to perform the features implemented by the logic of the anomaly detector 104 and/or the system 100. The computer code may include instructions executable with the processor 502.

The memory 504 may be any device for storing and retrieving data or any combination thereof. The memory 504 may include non-volatile and/or volatile memory, such as a random access memory (RAM), a read-only memory (ROM), an erasable programmable read-only memory (EPROM), or flash memory. Alternatively or in addition, the memory 504 may include an optical, magnetic (hard-drive) or any other form of data storage device.

The memory 504 may include the node 112, the second node 114, the anomaly detector 104, the trainer 116, the monitor 118, the handler 120, and/or the OS 102.

Each component may include additional, different, or fewer components. For example, the anomaly detector 104 may include only the monitor 118. As another example, the message 202 may not include the indication 218 of the parameters 214.

The system 100 may be implemented in many different ways. Each module, such as the anomaly detector 104, the trainer 116, the monitor 118, and the handler 120, may be hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory 504, for example, that comprises instructions executable with the processor 502 or other processor to implement one or more of the features of the module. When any one of the module includes the portion of the memory that comprises instructions executable with the processor, the module may or may not include the processor. In some examples, each module may just be the portion of the memory 504 or other physical memory that comprises instructions executable with the processor 502 or other processor to implement the features of the corresponding module without the module including any other hardware. Because each module includes at least some hardware even when the included hardware comprises software, each module may be interchangeably referred to as a hardware module.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device. However, the computer readable storage medium is not a transitory transmission medium for propagating signals.

The processing capability of the system 100 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

All of the discussion, regardless of the particular implementation described, is exemplary in nature, rather than limiting. For example, although selected aspects, features, or components of the implementations are depicted as being stored in memories, all or part of the system or systems may be stored on, distributed across, or read from other computer readable storage media, for example, secondary storage devices such as hard disks, flash memory drives, floppy disks, and CD-ROMs. Moreover, the various modules and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer, central processing unit ("CPU"), graphics processing unit ("GPU"), or system.

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same program or apparatus. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

1. A method of detecting a call sequence anomaly in a message-based operating system, the method comprising:

receiving a message indicating an invocation of a programmatic procedure of an operating system, the message including a programmatic procedure identifier, a sender process identifier, and a receiver process identifier, wherein the invocation of the programmatic procedure is one invocation in a series of invocations of operating system programmatic procedures made from a process identified by the sender process identifier;

generating an invocation hash based on at least the programmatic procedure identifier and the receiver process identifier;

translating the invocation hash to an invocation identifier;

including the invocation identifier in a translated call sequence that comprises invocation identifiers for the series of invocations;

determining whether the translated call sequence is included in a plurality of predetermined call sequences, each of the predetermined call sequences comprising corresponding invocation identifiers, wherein each of the corresponding invocation identifiers are mapped to invocation hashes; and identifying the translated call sequence as an anomaly if the translated call sequence is not included in the predetermined call sequences otherwise determining the translated call sequence is not an anomaly.

2. The method of aspect 1, wherein invocation hash is also based on the sender process identifier.

3. The method of any of aspects 1 to 2, wherein the message includes an indication of parameters passed to the programmatic procedure, and wherein the invocation hash is also based on the indication of parameters passed to the programmatic procedure.

4. The method of any of aspects 1 to 3, wherein the message includes a channel identifier, and wherein the invocation hash is also based on the channel identifier.

5. The method of any of aspects 1 to 4, wherein the message includes a receiver node identifier, and wherein the invocation hash is also based on the receiver node identifier.

6. The method of any of aspects 1 to 5, wherein translating the invocation hash comprises searching for the invocation hash in a translation table comprising invocation hashes associated with the invocation identifiers.

7. The method of aspect 6, wherein the invocation identifier is a row number in the translation table that includes the invocation hash.

8. A non-transitory computer readable storage medium comprising computer executable instructions, the computer executable instructions executable by a processor, the computer executable instructions comprising:

instructions executable to receive a message indicating an invocation of a programmatic procedure of an operating system, the message including a programmatic procedure identifier, a sender process identifier, and a receiver process identifier, wherein the invocation of the programmatic procedure is one invocation in a series of invocations of operating system programmatic procedures made from a process identified by the sender process identifier;

instructions executable to generate an invocation hash based on at least a portion of the message;

instructions executable to translate the invocation hash to an invocation identifier;

instructions executable to include the invocation identifier in a translated call sequence that comprises invocation identifiers for the series of invocations;

instructions executable to determine whether the translated call sequence is included in a plurality of predetermined call sequences, each of the predetermined call sequences comprising corresponding invocation identifiers, wherein each of the corresponding invocation identifiers are mapped to invocation hashes; and instructions executable to identify the translated call sequence as an anomaly if the translated call sequence is not included in the predetermined call sequences and, otherwise, to determine the translated call sequence is not an anomaly.

9 The non-transitory computer readable storage medium of aspect 8, wherein a determination of whether the translated call sequence is included in the predetermined call sequences is based on a search for the translated call sequence in a table, wherein the table comprises rows of sets of invocation identifiers, each of the invocation identifiers is associated in a translation data structure with a corresponding invocation hash.

10. The non-transitory computer readable storage medium of any of aspects 8 to 9, wherein receipt of the message comprises a read of information about the invocation of the programmatic procedure from a trace file.

11. The non-transitory computer readable storage medium of any of aspects 8 to 10, wherein receipt of the message comprises receipt of the message in the form of a registered callback from the operating system.

12. The non-transitory computer readable storage medium of any of aspects 8 to 11, wherein the generation of the invocation hash comprises an application of a hash function that maps data of arbitrary size to data of a fixed size, the hash function applied to data comprising the programmatic procedure identifier, the sender process identifier, and the receiver process identifier.

13. A system to detect a call sequence anomaly in a message-based operating system, the system comprising:
a processor configured to:
receive a message indicating an invocation of a programmatic procedure of an operating system, the message including a programmatic procedure identifier, a sender process identifier, and a receiver process identifier, wherein the invocation of the programmatic procedure is one invocation in a series of invocations of operating system programmatic procedures made from a process identified by the sender process identifier;
generate an invocation hash based on at least a portion of the message;
translate the invocation hash to an invocation identifier;
include the invocation identifier in a translated call sequence that comprises invocation identifiers for the series of invocations;
determine whether the translated call sequence is included in a plurality of predetermined call sequences, each of the predetermined call sequences comprising corresponding invocation identifiers, wherein each of the corresponding invocation identifiers are mapped to invocation hashes; and
identify the translated call sequence as an anomaly if the translated call sequence is not included in the predetermined call sequences and, otherwise, to determine the translated call sequence is not an anomaly.

14. The system of aspect 13, wherein the processor is configured to generate the invocation hash based on at least the receiver process identifier.

15. The system of any of aspects 13 to 14, wherein the processor is configured to generate the invocation hash based on at least the sender process identifier and the receiver process identifier.

16. The system of any of aspects 13 to 15, wherein the message comprises the programmatic procedure identifier, the sender process identifier, the receiver process identifier, a channel identifier, a receiver node identifier, parameters of the programmatic procedure, and/or an indication of the parameters passed to the programmatic procedure.

17. The system of any of aspects 13 to 16, wherein the processor is configured to generate the invocation hash based on at least one of the programmatic procedure identifier, the sender process identifier, the receiver process identifier, the channel identifier, the receiver node identifier, the parameters of the programmatic procedure, and/or the indication of the parameters passed to the programmatic procedure.

18. The system of any of aspects 13 to 17, wherein the processor is configured to change a security level in response to identification of the translated call sequence as an anomaly.

19. The system of aspect 18, wherein the processor is configured to change the security level in response to a determination that the identification of the translated call sequence as an anomaly exceeds a threshold number of anomalies.

What is claimed is:

1. A method of detecting a call sequence in a computing system, the computing system storing a set of call sequences, each call sequence containing a sequence of invocation identifiers that specify a valid sequence of programmatic procedures, wherein each invocation identifier corresponds to a message that invokes a corresponding programmatic procedure, the method comprising:
receiving a new message from a process, the new message including at least a programmatic procedure identifier and a receiver process identifier;
determining a corresponding invocation identifier based on at least the programmatic procedure identifier and the receiver process identifier;
appending the corresponding invocation identifier to a sequence of previously-determined invocation identifiers corresponding to a sequence of previously-received messages from the process to generate a translated call sequence;
identifying the translated call sequence as an anomaly based on selecting a portion of the translated call sequence and determining that the portion of the translated call sequence does not match at least one of the call sequences in the set of call sequences; and
causing an action based on identification of the translated call sequence as an anomaly.

2. The method of claim 1, wherein determining a corresponding invocation identifier includes:
generating a new invocation hash based on at least the programmatic procedure identifier and the receiver process identifier; and
determining the corresponding invocation identifier from the new invocation hash and stored associations between invocation hashes and invocation identifiers.

3. The method of claim 2, wherein the message further includes a channel identifier, a sender process identifier, a receiver node identifier and wherein the invocation hash is further based on at least the channel identifier or the sender process identifier.

4. The method of claim 1, wherein each of the previously-received messages contains a same sender process identifier, and the new message contains the same sender process identifier.

5. The method of claim 1, wherein selecting a portion is based on window size.

6. The method of claim 1, wherein appending the corresponding invocation identifier includes removing an oldest invocation identifier from the sequence of previously-determined invocation identifiers to maintain the translated call sequence at a fixed number of invocation identifiers.

7. A non-transitory computer readable storage medium comprising computer executable instructions, the computer executable instructions executable by a processor to detect a call sequence in a computing system, the computing system storing a set of call sequences, each call sequence containing a sequence of invocation identifiers that specify a valid sequence of programmatic procedures, wherein each invocation identifier corresponds to a message that invokes a corresponding programmatic procedure, the computer executable instructions comprising:

instructions executable to receive a new message from a process, the new message including at least a programmatic procedure identifier and a receiver process identifier;

instructions executable to determine a corresponding invocation identifier based on at least the programmatic procedure identifier and the receiver process identifier;

instructions executable to append the corresponding invocation identifier to a sequence of previously-determined invocation identifiers corresponding to a sequence of previously-received messages from the process to generate a translated call sequence;

instructions executable to identify the translated call sequence as an anomaly based on selecting a portion of the translated call sequence and determining that the portion of the translated call sequence does not match at least one of the call sequences in the set of call sequences; and  instructions executable to cause an action based on identification of the translated call sequence as an anomaly.

8. The non-transitory computer readable storage medium of claim 7, wherein the instructions executable to determine a corresponding invocation identifier include:

instructions executable to generate a new invocation hash based on at least the programmatic procedure identifier and the receiver process identifier; and  instructions executable to determine the corresponding invocation identifier from the new invocation hash and stored associations between invocation hashes and invocation identifiers.

9. The non-transitory computer readable storage medium of claim 8, wherein the message further includes a channel identifier, a sender process identifier, a receiver node identifier and wherein the invocation hash is further based on at least the channel identifier or the sender process identifier.

10. The non-transitory computer readable storage medium of claim 7, wherein each of the previously-received messages contains a same sender process identifier, and the new message contains the same sender process identifier.

11. The non-transitory computer readable storage medium of claim 7, wherein the instructions executable to append the corresponding invocation identifier include instructions executable to remove an oldest invocation identifier from the sequence of previously-determined invocation identifiers to maintain the translated call sequence at a fixed number of invocation identifiers.

12. A computing system to detect a call sequence anomaly in the computing system, the computing system comprising:

memory storing a set of call sequences, each call sequence containing a sequence of invocation identifiers that specify a valid sequence of programmatic procedures, wherein each invocation identifier corresponds to a message that invokes a corresponding programmatic procedure;

a processor;

processor-executable instructions that, when executed by the processor, are to cause the processor to:

receive a new message from a process, the new message including at least a programmatic procedure identifier and a receiver process identifier;

determine a corresponding invocation identifier based on at least the programmatic procedure identifier and the receiver process identifier;

append the corresponding invocation identifier to a sequence of previously-determined invocation identifiers corresponding to a sequence of previously-received messages from the process to generate a translated call sequence;

identify the translated call sequence as an anomaly based on selecting of a portion of the translated call sequence and a determination that the portion of the translated call sequence does not match at least one of the call sequences in the set of call sequences; and   cause an action based on identification of the translated call sequence as an anomaly.

13. The computing system of claim 12, wherein the instructions, when executed, are to cause the processor to determine a corresponding invocation identifier by:

generation of a new invocation hash based on at least the programmatic procedure identifier and the receiver process identifier; and  a determination of the corresponding invocation identifier from the new invocation hash and stored associations between invocation hashes and invocation identifiers.

14. The computing system of claim 13, wherein the message further includes a channel identifier, a sender process identifier, a receiver node identifier and wherein the invocation hash is further based on at least the channel identifier or the sender process identifier.

15. The computing system of claim 12, wherein each of the previously-received messages contains a same sender process identifier, and the new message contains the same sender process identifier.

16. The computing system of claim 12, wherein selection of a portion is based on window size.

17. The computing system of claim 12, wherein the instructions, when executed, are to cause the processor to append the corresponding invocation identifier by removal of an oldest invocation identifier from the sequence of previously-determined invocation identifiers to maintain the translated call sequence at a fixed number of invocation identifiers.

\* \* \* \* \*